Patented Nov. 4, 1941

2,261,773

UNITED STATES PATENT OFFICE 2,261,773

PROCESS OF MANUFACTURING SEMISTIFF COLLARS

Dorman McBurney, Newburgh, N. Y., assignor to E. I. du Pont de Nemours & Company, Wilmington, Del., a corporation of Delaware No Drawing. Application April 6, 1939, Serial No. 266,422

4 Claims. (Cl. 154—2)

This invention relates to wearing apparel of the type to be laundered, and more particularly to the stiffened portions of launderable wearing apparel, such as shirts, collars, cuffs, plaits and the like.

Many efforts have been made to provide improved wearing apparel of the above mentioned types in order to impart a semi-stiff condition and improved appearance to articles and prevent them from wilting or becoming wrinkled, especially in warm weather, and so they will not be sensitive to water spots.

It has been found, however, that many such articles, while possessing the desired properties mentioned above, have a moiré appearance, and are therefore objectionable, particularly where made of plain white material, and to a lesser degree where made of solid colors, or of figured or multi-colored goods.

I have discovered that this moiré appearance can be overcome by using fabric plies arranged in certain ways and having certain relationships between the actual thread count in the various plies.

By the term "multi-ply fabrics," as used herein, is meant laminated fabric constructions comprising two or more plies of fabric.

By the term "moire," as used herein, is meant a wavy or "watered" pattern that is visible on the exposed outer surface of the multi-ply fabric.

By the term "cross-wise relation," as used herein, is meant a laminated arrangement of the plies in which, where there are three or more plies, the length of the exposed (when worn) outer ply is cut in the direction of the warp threads, and the length of the adjacent intermediate ply is cut in the direction of the filler threads, or the length of the exposed outer ply is cut in the direction of the filler threads, and the length of the adjacent intermediate ply is cut in the direction of the warp threads; and where there are only two plies, one ply is cut in the direction of the warp threads and the other ply is cut in the direction of the filler threads.

By the term "ratio," as used herein, is meant the quotient obtained by dividing the number of substantially parallel threads per inch in any ply, in either the warp or filler direction, by the number of threads per inch substantially parallel thereto in the adjacent superposed ply.

It is therefore an object of this invention to provide a process of making improved articles of launderable wearing apparel, and more particularly with respect to making the stiffened portions of such apparel.

It is another object of this invention to provide a process of making semi-stiff shirts, collars, cuffs, plaits and the like which are free of any moiré pattern.

It is a further object of this invention to provide a process of making such articles of wearing apparel in which the stiffened portions are multi-ply fabrics arranged in cross-wise relation.

It is also an object of this invention to provide the improved articles of wearing apparel referred to above which are free of moire.

With the above and other objects in view, which will be apparent as the description proceeds, the invention is set forth in the following specification by way of illustration, but not as a limitation thereof.

Shirts, collars, cuffs, plaits and the like falling within the scope of the invention may be made in various ways without departing from the scope of the invention, since the latter is not dependent upon any particular method of securing the bonding of the various plies, or on the process of making the multi-ply fabrics, except insofar as this involves the materials out of which the plies are made and their arrangement in the finished article, although it will be understood that the invention is limited to the so-called "chemical" collars in which the plies are united either by the use of a thermoplastic adhesive, or by an adhesive which may be activated with the aid of a solvent, and then subjected to pressure.

The primary feature of this invention comprises the discovery that, in articles of the type referred to above, in which all of the threads in each direction are arranged in substantially parallel cross-wise relation, the moire will be eliminated if:

(1) All ratios of superposed substantially parallel threads fall within any one or more of the ranges given in Table III, or (2) The ratios of one set of superposed substantially parallel threads fall within any one or more of the ranges given in Table III and the ratios of the other set of superposed substantially parallel threads fall within any one or more of the ranges given in Table IV.

Provided the superposed substantially parallel threads are arranged in cross-wise relation and the above ratios are observed, any suitable adhesive materials or fabrics, and any suitable method of making the multi-ply fabric, may be used.

Examples of suitable methods and adhesive coatings are disclosed and claimed in McBurney and Nollau co-pending applications Serial No. 5,078, filed February 5, 1935, now Patent No. 2,201,908, Serial No. 146,960, filed June 7, 1937, and Patent 2,083,199.

In these disclosures there is set forth a method of making semi-stiff shirts, collars, cuffs, plaits and the like in which the material to be used as an interlining is coated on one or both sides, or impregnated with a thermoplastic cement, such as one comprising polymeric methyl methacrylate. The adhesive coating is then dried, as by passing the coated material through a heated chamber to expel the volatile solvents which are actually present in the thermoplastic adhesive coating. By means of a suitable die or other means, the coated interliner and the outer plies, the latter being preferably of broadcloth, are cut to any desired shape or pattern. The collar is assembled by placing one shaped ply of outer fabric on top of another shaped ply of outer fabric, laying the shaped coated interliner ply on top of the outer plies, and stitching the three separate plies on three sides. The side which is later to be attached to the neckband is not stitched at this stage. The collar is turned inside out so that the interlining will be between the two outer plies. A row of ornamental stitching is then preferably applied along the three edges previously stitched. The collar top or cape portion, consisting of the three shaped plies, is now ready to be fused by means of heat and pressure. In the fusing operation, a smooth, hot plate is preferably pressed against the exposed outer ply of the multi-ply fabric supported on a resilient cushion. The collar top is now ready to be attached to the neckband by placing the unstitched edge of the three plies, which have been fused together, between the edges of the neckband plies and attaching thereto by a row of stitching. When desired, the cape portion or collar top, after turning inside out, may be attached to the neckband plies before fusing. The cape portion of the collar is folded back over the neckband to form the completed collar.

In another method of making articles of this type the same sequence of steps is followed except that the adhesive material with which the interliner is coated need not be a thermoplastic material, but is one which becomes adhesive when activated by a suitable solvent. Examples of materials that may be used in this manner are vinyl resins, such as copolymers of vinyl chloride and vinyl acetate, or mixtures of such copolymers and vinyl polymers and plasticized cellulose derivatives. Suitable agents for activating such adhesives are ketones and alkyl esters, and mixtures thereof.

From the above description it will be apparent that the invention comprises arranging the adjacent plies in crosswise relation, although the preferred embodiment comprises cutting the length of the interliner ply in the direction of the filler threads and cutting the length of the outer plies, such as broadcloth plies, in the direction of the warp of the fabric, and, in both the generic form and the preferred form, assembling these plies, including the properly coated or impregnated interliner, in any suitable manner, provided only that the filler threads in one ply are arranged parallel to the warp threads in the adjacent ply, and the ratio of the superposed parallel threads of the fabrics used falls within the ranges set forth below.

In a preferred embodiment of my invention, the interliner is a 6.15—46½″ sheeting having a theoretical thread count of 40 x 38 (although its actual thread count after coating was 42 x 37), which is used in conjunction with 4.00—37″ outer broadcloth plies having a theoretical thread count of 136 x 60 (although its actual thread count after forming the multi-ply fabric was 137 x 64).

As will be obvious, the actual thread count will often differ from the theoretical thread count, particularly with respect to the thread count of the interliner ply or the outer ply after it is coated. Consequently, the actual thread count as given in the specification and claims refers to the actual thread count of the uncoated outer ply and the actual thread count of the coated ply after the coating is applied, regardless of whether the latter is an interliner ply (as in laminated fabrics containing three or more plies) or the other outer ply (as in laminated fabrics containing only two plies).

As examples of the effect of various combinations of broadcloth and interliner arranged as set forth above, I have included the following tables in which the effect with respect to moiré is as indicated in the column headed "Result," and in which the ratios of superposed parallel threads based on actual thread count, including that of the broadcloth outer ply after forming the multi-ply fabric and the coated interliner ply, are as indicated in Table I.

TABLE I

*Frequency of moiré patterns in collars*

| Broadcloth (lengthwise) | | | Interliner (crosswise) | | | Ratios (based on actual thread count) | | | | Result |
|---|---|---|---|---|---|---|---|---|---|---|
| Weight— width | Theoretical thread count | Actual thread count | Weight— width | Theoretical thread count | Actual thread count | Broadcloth warp, interliner filler | Broadcloth filler, interliner warp | Interliner filler, broadcloth warp | Interliner warp, broadcloth filler | |
| | W   F | W   F | | W   F | W   F | | | | | |
| 4.20—37½″ | 116 x 60 | 120 x 60 | 6.15—46½″ | 40 x 38 | 42 x 37 | 120/37=3.24 | 60/42=1.43 | 37/120=.31 | 42/60=.70 | No moire. |
| 4.20—37½″ | 116 x 60 | 119 x 61 | 6.40—44″ | 48 x 48 | 50 x 46 | 119/46=2.59 | 61/50=1.22 | 46/119=.39 | 50/61=.82 | Sl. moire. |
| 4.20—37½″ | 116 x 60 | 118 x 62 | 5.85—43″ | 56 x 52 | 62 x 51 | 118/51=2.31 | 62/62=1.00 | 51/118=.43 | 62/62=1.00 | Moire. |
| 4.20—37½″ | 116 x 60 | 119 x 61 | 4.75—39″ | 68 x 72 | 68 x 68 | 119/68=1.75 | 61/68=.90 | 68/119=.57 | 68/61=1.11 | Sl. moire. |
| 4.20—37½″ | 116 x 60 | 119 x 60 | 3.85—44″ | 80 x 80 | 81 x 75 | 119/75=1.59 | 60/81=.74 | 75/119=.63 | 81/60=1.35 | No moire. |
| 4.20—37½″ | 116 x 60 | 119 x 61 | 4.75—39″ | 88 x 80 | 86 x 87 | 119/87=1.37 | 61/86=.71 | 87/119=.73 | 86/61=1.41 | No moire. |
| 4.20—37½″ | 116 x 60 | 121 x 61 | 7.00—40″ | 96 x 100 | 94 x 101 | 121/101=1.20 | 61/94=.65 | 101/121=.83 | 94/61=1.54 | No moire. |
| 4.10—37″ | 128 x 68 | 128 x 69 | 6.15—46½″ | 40 x 38 | 43 x 36 | 128/36=3.555 | 69/43=1.60 | 36/128=.28 | 43/69=.62 | No moire. |
| 4.10—37″ | 128 x 68 | 132 x 69 | 6.40—44″ | 48 x 48 | 52 x 47 | 132/47=2.81 | 69/52=1.33 | 47/132=.36 | 52/69=.75 | No moire. |
| 4.10—37″ | 128 x 68 | 135 x 70 | 5.85—43″ | 56 x 52 | 62 x 52 | 135/52=2.60 | 70/62=1.13 | 52/135=.385 | 62/70=.885 | Moire. |
| 4.10—37″ | 128 x 68 | 130 x 71 | 4.75—39″ | 68 x 72 | 69 x 69 | 130/69=1.88 | 71/69=1.03 | 69/130=.53 | 69/71=.97 | Sl. moire. |
| 4.10—37″ | 128 x 68 | 127 x 70 | 3.85—44″ | 80 x 80 | 81 x 75 | 127/75=1.69 | 70/81=.86 | 75/127=.59 | 81/70=1.16 | Sl. moire. |
| 4.10—37″ | 128 x 68 | 129 x 70 | 4.75—39″ | 88 x 80 | 86 x 83 | 129/83=1.55 | 70/86=.81 | 83/129=.64 | 86/70=1.23 | No moire. |
| 4.10—37″ | 128 x 68 | 133 x 69 | 7.00—40″ | 96 x 100 | 99 x 97 | 133/97=1.37 | 69/99=.70 | 97/133=.73 | 99/69=1.43 | No moire. |
| 4.00—37″ | 136 x 60 | 137 x 64 | 6.15—46½″ | 40 x 38 | 42 x 37 | 137/37=3.70 | 64/42=1.52 | 37/137=.27 | 42/64=.66 | No moire. |
| 4.00—37″ | 136 x 60 | 136 x 63 | 6.40—44″ | 48 x 48 | 50 x 47 | 136/47=2.89 | 63/50=1.26 | 47/136=.345 | 50/63=.79 | Very slight. |
| 4.00—37″ | 136 x 60 | 138 x 64 | 5.85—43″ | 56 x 52 | 62 x 51 | 138/52=2.65 | 64/62=1.03 | 52/138=.38 | 62/64=.97 | Moire. |
| 4.00—37″ | 136 x 60 | 138 x 65 | 4.75—39″ | 68 x 72 | 67 x 69 | 138/69=2.00 | 65/67=.97 | 69/138=.50 | 67/65=1.03 | Moire. |
| 4.00—37″ | 136 x 60 | 134 x 65 | 3.85—44″ | 80 x 80 | 78 x 76 | 134/76=1.76 | 65/78=.83 | 76/134=.57 | 78/65=1.20 | Very slight. |
| 4.00—37″ | 136 x 60 | 141 x 63 | 4.75—39″ | 88 x 80 | 89 x 84 | 141/84=1.68 | 63/89=.71 | 84/141=.595 | 89/63=1.41 | No moire. |
| 4.00—37″ | 136 x 60 | 142 x 64 | 7.00—40″ | 96 x 100 | 95 x 94 | 142/94=1.51 | 64/95=.67 | 94/142=.66 | 95/64=1.48 | No moire. |

TABLE I—Continued

*Frequency of moiré pattern in collars*

| Broadcloth (lengthwise) | | | Interliner (crosswise) | | | Ratios (based on actual thread count) | | | | Result |
|---|---|---|---|---|---|---|---|---|---|---|
| Weight—width | Theoretical thread count | Actual thread count | Weight—width | Theoretical thread count | Actual thread count | Broadcloth warp, interliner filler | Broadcloth filler, interliner warp | Interliner filler, broadcloth warp | Interliner warp, broadcloth filler | |
| | W F | W F | | W F | W F | | | | | |
| 4.32—37" | 144 x 76 | 150 x 74 | 6.15—46½" | 40 x 38 | 42 x 37 | 150/37=4.05 | 74/42=1.76 | 37/150=.25 | 42/74=.57 | Very slight. |
| 4.32—37" | 144 x 76 | 150 x 72 | 6.40—44" | 48 x 48 | 51 x 46 | 150/46=3.26 | 72/51=1.41 | 46/150=.31 | 51/72=.71 | No moire. |
| 4.32—37" | 144 x 76 | 149 x 72 | 5.85—43" | 56 x 52 | 60 x 51 | 149/51=2.92 | 72/60=1.20 | 51/149=.34 | 60/72=.83 | Moire. |
| 4.32—37" | 144 x 76 | 148 x 74 | 4.75—39" | 68 x 72 | 68 x 68 | 148/68=2.18 | 74/68=1.09 | 68/148=.46 | 68/74=.92 | Moire. |
| 4.32—37" | 144 x 76 | 150 x 73 | 3.85—44" | 80 x 80 | 80 x 75 | 150/75=2.00 | 73/80=.91 | 75/150=.50 | 80/73=1.095 | Moire. |
| 4.32—37" | 144 x 76 | 150 x 74 | 4.75—39" | 88 x 80 | 86 x 84 | 150/84=1.785 | 74/80=.925 | 84/150=.56 | 86/74=1.16 | Very slight. |
| 4.32—37" | 144 x 76 | 151 x 74 | 7.00—40" | 96 x 100 | 96 x 98 | 151/98=1.54 | 74/86=.86 | 98/151=.65 | 96/74=1.30 | No moire. |
| 4.00—37" | 168 x 84 | 166 x 85 | 6.15—46½" | 40 x 38 | 43 x 36 | 166/36=4.61 | 85/43=1.98 | 36/166=.22 | 43/85=.505 | Very slight. |
| 4.00—37" | 168 x 84 | 165 x 85 | 6.40—44" | 48 x 48 | 50 x 46 | 165/46=3.59 | 85/50=1.70 | 46/165=.28 | 50/85=.59 | No moire. |
| 4.00—37" | 168 x 84 | 169 x 84 | 5.85—43" | 56 x 52 | 60 x 51 | 169/51=3.31 | 84/60=1.40 | 51/169=.30 | 60/84=.71 | No moire. |
| 4.00—37" | 168 x 84 | 167 x 83 | 4.75—39" | 68 x 72 | 66 x 68 | 167/68=2.455 | 83/66=1.26 | 68/167=.41 | 66/83=.795 | Sl. moire. |
| 4.00—37" | 168 x 84 | 167 x 85 | 3.85—44" | 80 x 80 | 82 x 74 | 167/74=2.26 | 85/82=1.04 | 74/167=.44 | 82/85=.96 | Moire. |
| 4.00—37" | 168 x 84 | 168 x 86 | 4.75—39" | 88 x 80 | 88 x 86 | 168/86=1.95 | 86/88=.98 | 86/168=.51 | 88/86=1.02 | Very slight. |
| 4.00—37" | 168 x 84 | 170 x 85 | 7.00—40" | 96 x 100 | 97 x 98 | 170/98=1.73 | 85/97=.88 | 98/170=.58 | 97/85=1.14 | Very slight. |

From Table I it will therefore be apparent that the ratios of superposed parallel threads which have been observed to produce moiré or absence of moiré, based on the items included in Table I, are as follows:

TABLE II

| Broadcloth | Ratio of parallel threads | Result |
|---|---|---|
| 144 x 76 | — to .25 | Moire. |
| 168 x 84 | — to .22 | Do. |
| 116 x 60 | — to .31 | No moire. |
| 128 x 68 | .28 to .36 | Do. |
| 136 x 60 | .27 to — | Do. |
| 144 x 76 | — to .31 | Do. |
| 168 x 84 | .28 to .30 | Do. |
| 116 x 60 | .39 to .57 | Moire. |
| 128 x 68 | .385 to .59 | Do. |
| 136 x 60 | .345 to .57 | Do. |
| 144 x 76 | — to .57 | Do. |
| 144 x 76 | .34 to .56 | Do. |
| 168 x 84 | — to .505 | Do. |
| 168 x 84 | .41 to .58 | Do. |
| 116 x 60 | .63 to .83 | No moire. |
| 116 x 60 | — to .70 | Do. |
| 116 x 60 | .65 to .74 | Do. |
| 128 x 68 | .62 to .75 | Do. |
| 128 x 68 | .64 to .73 | Do. |
| 128 x 68 | .70 to .81 | Do. |
| 136 x 60 | .66 to — | Do. |
| 136 x 60 | .595 to .66 | Do. |
| 136 x 60 | .67 to .71 | Do. |
| 144 x 76 | — to .71 | Do. |
| 144 x 76 | .65 to — | Do. |
| 144 x 76 | — to .86 | Do. |
| 168 x 84 | .59 to .71 | Do. |
| 116 x 60 | .82 to 1.11 | Moire. |
| 116 x 60 | .90 to 1.22 | Do. |
| 128 x 68 | .885 to 1.16 | Do. |
| 128 x 68 | .86 to 1.13 | Do. |
| 136 x 60 | .79 to 1.20 | Do. |
| 136 x 60 | .83 to 1.26 | Do. |
| 144 x 76 | .83 to 1.16 | Do. |
| 144 x 76 | .91 to 1.20 | Do. |
| 168 x 84 | .795 to 1.14 | Do. |
| 168 x 84 | .88 to 1.26 | Do. |
| 116 x 60 | 1.35 to 1.54 | No moire. |
| 116 x 60 | 1.43 to — | Do. |
| 116 x 60 | 1.20 to 1.59 | Do. |
| 128 x 68 | 1.23 to 1.43 | Do. |
| 128 x 68 | 1.33 to 1.60 | Do. |
| 128 x 68 | 1.37 to 1.55 | Do. |
| 136 x 60 | 1.41 to 1.48 | Do. |
| 136 x 60 | — to 1.52 | Do. |
| 136 x 60 | 1.51 to 1.68 | Do. |
| 144 x 76 | 1.30 to — | Do. |
| 144 x 76 | 1.41 to — | Do. |
| 144 x 76 | 1.54 to — | Do. |
| 168 x 84 | 1.40 to 1.70 | Do. |
| 116 x 60 | 1.75 to 2.59 | Moire. |
| 128 x 68 | 1.69 to 2.60 | Do. |
| 136 x 60 | 1.76 to 2.89 | Do. |
| 144 x 76 | 1.76 to — | Do. |
| 144 x 76 | 1.78 to 2.92 | Do. |
| 168 x 84 | 1.98 to — | Do. |
| 168 x 84 | 1.73 to 2.455 | Do. |
| 116 x 60 | — to 3.24 | No moire. |
| 128 x 68 | 2.81 to 3.555 | Do. |
| 136 x 60 | — to 3.70 | Do. |
| 144 x 76 | — to 3.26 | Do. |
| 168 x 84 | 3.31 to 3.59 | Do. |
| 144 x 76 | — to 4.05 | Moire. |
| 168 x 84 | — to 4.61 | Do. |

It will therefore be apparent that, with the arrangement of the outer and inner plies as set forth above, the ratios of superposed parallel threads, which clearly result in the elimination of moiré, are as follows:

TABLE III

Between .27 and .33
Between .595 and .78
Between 1.27 and 1.68
Between 2.93 and 3.70

In addition to the above ranges given in Table III, in which no moiré is produced when all ratios of superposed parallel threads fall within the ranges given in Table III, there are five cases given in Table I in which it has been found that the ratios of one set of superposed parallel threads fall within the ranges set forth in Table III, but the other set of superposed parallel threads falls without those ranges without the production of moiré. In such cases the ratio of the set of superposed parallel threads which falls without the ranges set forth in Table III can fall within the slightly broader ranges set forth in Table IV below without the production of moiré.

TABLE IV

Between .27 and .36
Between .59 and .86
Between 1.20 and 1.70
Between 2.81 and 3.70

It will be obvious that where an excessively heavy coating of adhesive is applied to the interliner, this will prevent the moiré effect, by obliterating the pattern of the interliner, but for most practical uses this thickness of coating would introduce other objectionable characteristics. It will therefore readily be understood that in the practice of this invention the layer of the adhesive coating applied to the interliner must be kept thin enough to avoid undue stiffness, excessive thickness of the resulting product, and poor washability.

Although, as indicated above, the presence of moire is now regarded as objectionable in semi-stiff shirts, collars, cuffs, plaits and the like, it will be obvious that if there should ever be a demand for a controlled moiré effect, this can be obtained by using ratios of superposed parallel threads such as those set forth in Tables I and II above, which are shown to result in moiré.

It is apparent that many widely different embodiments of this invention may be made without departing from the spirit and scope thereof; and, therefore, it is not intended to be limited except as indicated in the appended claims.

I claim:

1. In the process of manufacturing semi-stiff collars of multi-ply fabrics, the step of eliminating a moiré pattern which comprises selecting coated and uncoated fabrics arranged in cross-wise relation in which all ratios of the number of substantially parallel threads per inch in the uncoated fabric to the number of threads per inch substantially parallel thereto in the superposed coated fabric fall within the following ranges:

Between .27 and .33
   Between .595 and .78
   Between 1.27 and 1.68
   Between 2.93 and 3.70

2. In the process of manufacturing semi-stiff collars of multi-ply fabrics, the step of eliminating a moiré pattern which comprises selecting coated interlining and uncoated outer fabrics arranged in cross-wise relation in which all ratios of the number of substantially parallel threads per inch in the uncoated outer fabric to the number of threads per inch substantially parallel thereto in the superposed coated interlining fall within the following ranges:

Between .27 and .33
   Between .595 and .78
   Between 1.27 and 1.68
   Between 2.93 and 3.70

3. In the process of manufacturing semi-stiff collars of multi-ply fabrics, the step of eliminating a moiré pattern which comprises selecting coated interlining and uncoated outer fabrics arranged in cross-wise relation in which, with respect to one set of superposed substantially parallel threads, the ratios of the number of substantially parallel threads per inch in the uncoated outer fabric to the number of threads per inch substantially parallel thereto in the superposed coated interlining fall within the following ranges:

Between .27 and .33
   Between .595 and .78
   Between 1.27 and 1.68
   Between 2.93 and 3.70 but in which, with respect to the other set of superposed substantially parallel threads, the ratios of the number of substantially parallel threads per inch in the uncoated outer fabric to the number of threads per inch substantially parallel thereto in the superposed coated interlining fall within the following ranges:

Between .27 and .36
   Between .59 and .86
   Between 1.20 and 1.70
   Between 2.81 and 3.70

4. The process of manufacturing semi-stiff collars that are free from moiré pattern out of multi-ply fabrics which comprises coating a plurality of interlining fabrics with the desired adhesive, counting the number of threads per inch in these and counting the number of threads of uncoated outer fabrics, and selecting uncoated interlining and outer fabrics in which all ratios of the number of substantially parallel threads per inch of the interliner, when coated in the same way as before, to the number of threads per inch substantially parallel thereto in the outer ply that is to be superposed thereon in cross-wise relation fall within the following ranges:

Between .27 and .33
   Between .595 and .78
   Between 1.27 and 1.68
   Between 2.93 and 3.70 providing the interlining material selected with an adhesive coating under the same conditions as those to which the sample of coated interlining had been coated, cutting the interlining and outer fabrics to the desired shape, assembling the interlining and outer fabrics so that they will be arranged in cross-wise relation, and permanently bonding the interlining and outer fabrics together through the adhesive coating.

DORMAN McBURNEY.